Figure 1:
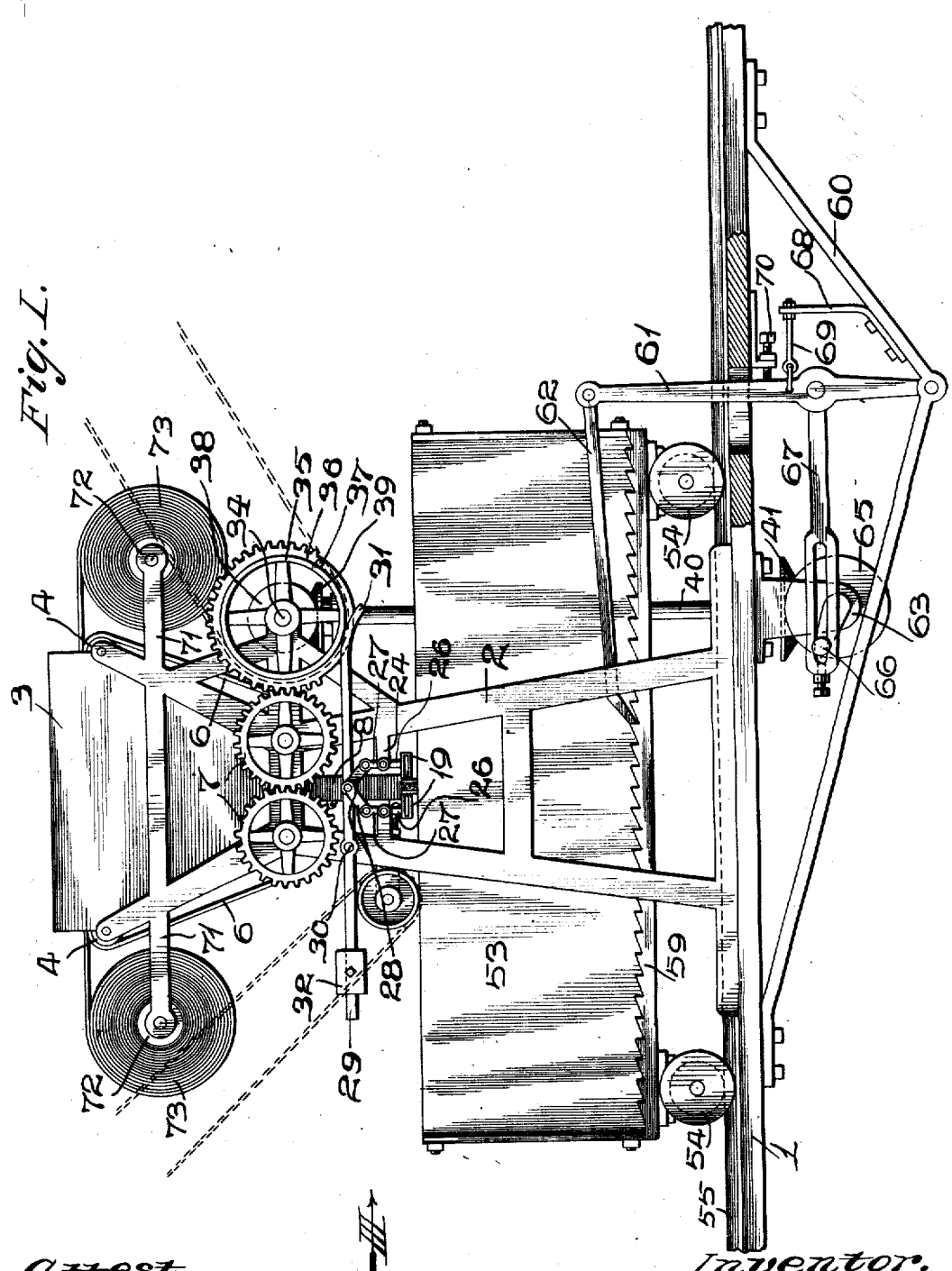

C. DRILL.
MACHINE FOR MAKING PLASTER BOARDS.
APPLICATION FILED SEPT. 19, 1907.

906,619.

Patented Dec. 15, 1908.
4 SHEETS—SHEET 1.

Attest.
H. J. Fletcher.
E. M. Harrington.

Inventor.
Charles Drill
By Higdon & Longan,
att'ys.

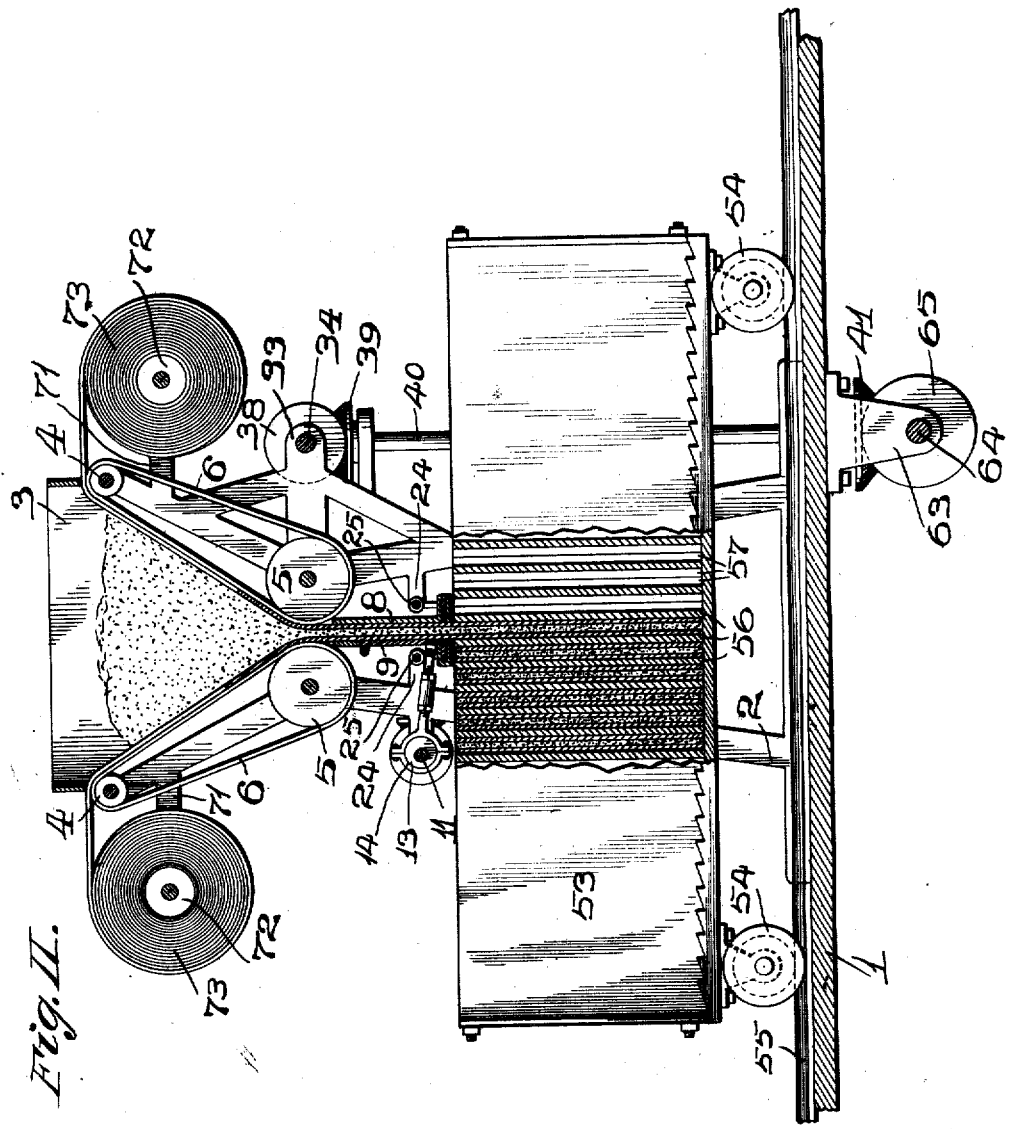

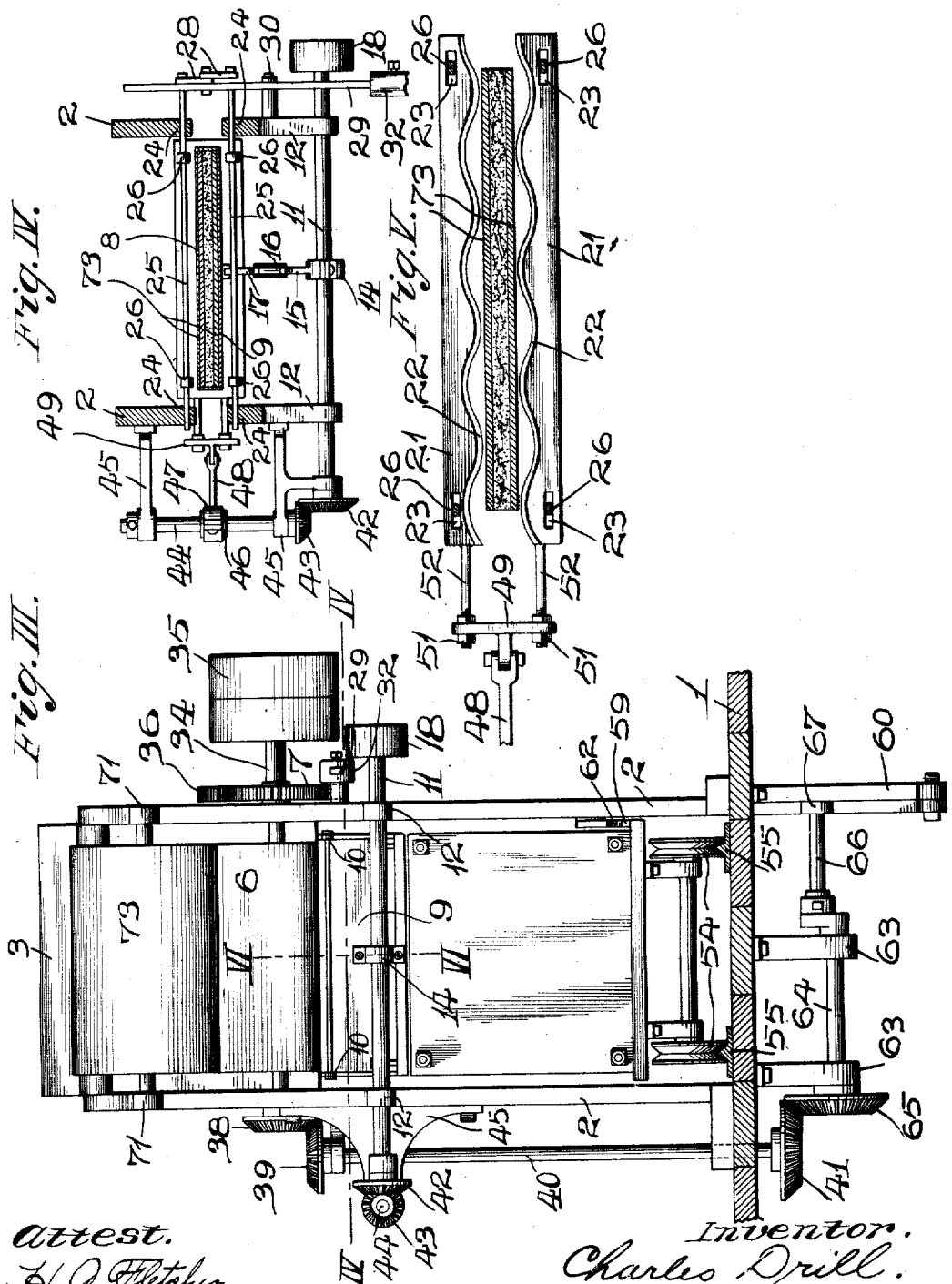

C. DRILL.
MACHINE FOR MAKING PLASTER BOARDS.
APPLICATION FILED SEPT. 19, 1907.
No. 906,619. Patented Dec. 15, 1908.
4 SHEETS—SHEET 4.
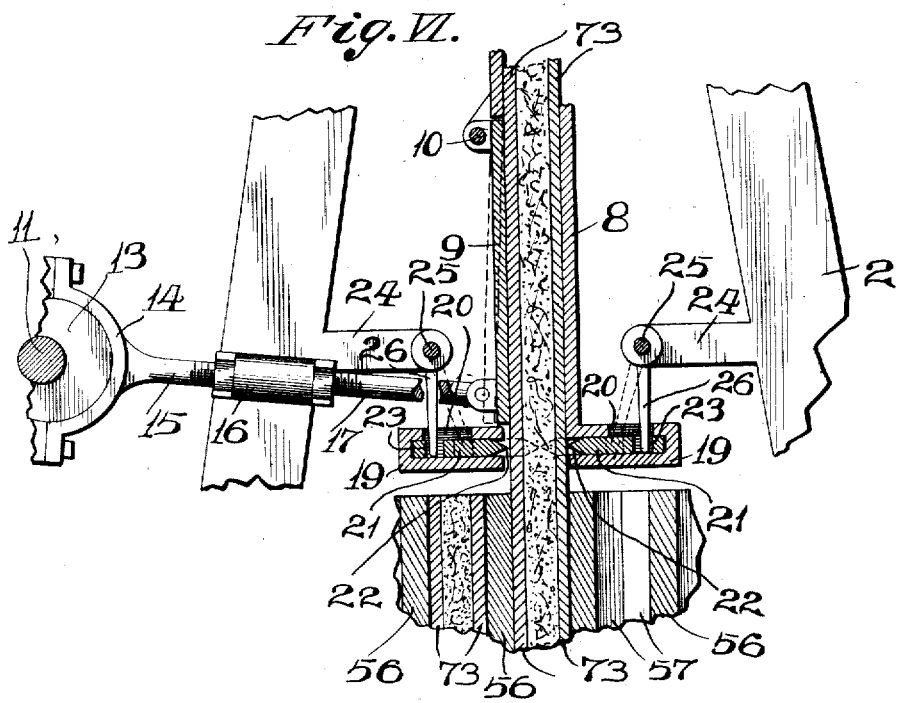
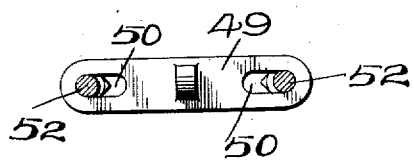
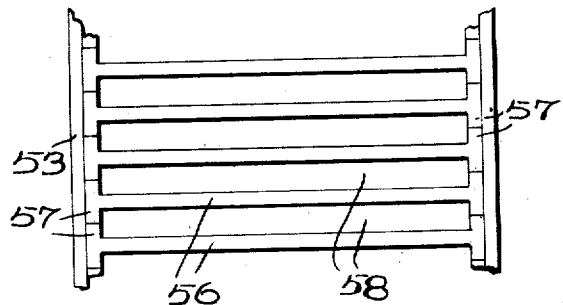
Attest.
H. J. Fletcher.
E. M. Harrington.
Inventor.
Charles Drill.
By Higdon Longan
Att'ys.

UNITED STATES PATENT OFFICE.

CHARLES DRILL, OF ST. LOUIS, MISSOURI, ASSIGNOR TO JOHN EHRHARDT, JR., OF ST. LOUIS, MISSOURI.

MACHINE FOR MAKING PLASTER-BOARDS.

No. 906,619.      Specification of Letters Patent.      Patented Dec. 15, 1908.

Application filed September 19, 1907. Serial No. 393,735.

*To all whom it may concern:*

Be it known that I, CHARLES DRILL, a citizen of the United States, and resident of St. Louis, Missouri, have invented certain new and useful Improvements in Machines for Making Plaster-Boards, of which the following is a specification containing a full, clear, and exact description, reference being had to the accompanying drawings, forming a part hereof.

My invention relates to a machine for making plaster boards such as are used for building purposes, and which plaster boards are formed of a pair of sheets of paper, or analogous material, between which is a filling of plaster, or analogous plastic material, which becomes hard when dry; and the object of my invention is to construct a simple, inexpensive machine which can be operated with a minimium amount of power, and which will rapidly form a series of equal sized plaster boards, which, when dried and hardened, are ready for use.

A further object of my invention is to construct a machine for the manufacture of plaster boards which is entirely automatic in all of its operations, and which requires no attention after being set in operation further than the maintenance of a sufficient supply of plastic material in the hopper above the forming means.

A further object of my invention is to provide a plaster board machine wherein the plastic material is packed as it passes between the sheets of paper, or like material, forming the surfaces of the board.

To the above purposes, my invention consists in certain novel features of construction and arrangement of parts, which will be hereinafter more fully set forth, pointed out in the claims, and illustrated in the accompanying drawings, in which—

Figure I is a side elevation of a plaster board machine of my improved construction; Fig. II is a vertical section taken through the center of the machine with parts of the truck which receive the plaster boards after being formed, in elevation; Fig. III is an end view of the machine taken looking in the direction indicated by the arrow III in Fig. I; Fig. IV is a horizontal section taken approximately on the line IV—IV of Fig. III; Fig. V is a plan view, partly in section, of the knives utilized for cutting the sections of plaster board; Fig. VI is an enlarged detail section taken approximately on the line VI—VI of Fig. III; Fig. VII is an enlarged elevation of a yoke which connects the ends of the knives; Fig. VIII is a plan view of a portion of the truck which receives the plaster boards after the same are formed.

Referring by numerals to the accompanying drawings:—1 designates the base or platform on which the machine is mounted, and fixed thereon is a pair of vertically disposed side frames 2, between the upper ends of which is located an open bottomed hopper 3.

Journaled between the upper portions of the side frames 2, and at the ends of the hopper 3, is a pair of small rollers 4; and journaled between the side frames 2, at the lower end of the hopper, is a pair of large rollers 5, and operating thereon and upon the small rollers 4, are belts 6, which extend from one side of the hopper 3 to the other, thus forming a V-shaped bottom for said hopper. The trunnions of the rollers 5 are extended through the side frames 2 on the front side of the machine; and fixed on said extended trunnions are the meshing pinions 7.

Fixed to the side frames 2, and depending from a point between the rollers 5 is a vertically disposed chute 8, the space between the side walls of which determines the thickness of the plaster board to be manufactured, and the lower portion 9 of one of the side walls of this chute is hinged at its upper edge, as designated by 10, in order that it may be vibrated backward and forward during the time the plaster board is being formed, thus packing the material of which the boards are formed, and imparting perfect smoothness to the surfaces thereof.

A transversely disposed shaft 11 is arranged for rotation in bearings 12 formed on the side frames 2, and fixed on the center of said shaft is an eccentric 13, around which passes a strap 14; and fixed to the latter is a short rod 15, which is connected by means of a turn-buckle 16 to a short rod 17, the outer end of which is pivotally connected to the lower edge of the section 9.

A pulley 18 is fixed on one end of the shaft 11, and receives a belt suitably driven, thus rotating the shaft 11, and in turn imparting vibratory movement to the movable portion 9 of the chute 8.

Rigidly fixed in any suitable manner to the lower end of the fixed portion of the chute 8 are the oppositely arranged knife housings 19, in the tops of which are formed the oppositely arranged pairs of slots 20; and arranged to move longitudinally and horizontally within said housings 19 are knives 21, having scalloped cutting edges 22.

Formed through the knives 21, adjacent the ends thereof, are longitudinally extending slots 23, which, when the knives are positioned in the housings 19, coincide with the slots 20 formed in the tops of said housings.

Arranged for rotation in bearings 24, formed on the side frames 2, immediately above the housings 19, are the transversely disposed shafts 25, each of which carries a pair of depending fingers 26, the lower ends of which pass through the slots 20, and engage in the slots 23 in the knives. Fixed on these shafts, at one end thereof, are the vertically disposed fingers 27; and connected to the upper ends thereof are the lower ends of a pair of links 28, the upper ends of which are pivotally connected to the center of a horizontally arranged lever 29, which is fulcrumed at 30 to the outer face of one of the side members 2. The forward end of this lever is curved downward, as designated by 31, and the opposite end is provided with an adjustable weight 32.

Arranged for rotation in bearings 33, on the side members 2, and in alinement with the bearings in which the rollers 5 are journaled, is a transversely disposed shaft 34, on the front end of which is fixed a pulley 35, and a segmental gear wheel 36, which meshes with one of the pinions 7; and projecting from the side of the gear wheel 36 is a pin 37, which is adapted to engage against the curved end 31 of the lever 29. Fixed on the opposite end of this shaft 34 is a beveled pinion 38, which meshes with the corresponding beveled pinion 39 carried by the upper end of a vertically disposed shaft 40, which is arranged for operation in suitable bearings fixed on one of the side frames 2, and there being a beveled pinion 41 fixed on the lower end of said shaft.

Fixed on the end of the shaft 11, opposite from the pulley 18, is a beveled pinion 42, which meshes with the beveled pinion 43 fixed upon the end of a short shaft 44, which latter is arranged for rotation in suitable bearings 45 carried by one of the side frames 2, and occupying a position to the rear of the knife housings 19. Fixed on the center of this shaft 44 is an eccentric 46, around which passes a strap 47, and carried by the latter is a rod 48, which is pivotally connected to a yoke or cross bar 49, the ends thereof being provided with slots 50 (see Fig. VII); and passing through said slots and held to the yoke or cross bar by nuts 51 are the outer ends of rods 52, which are rigidly fixed to the ends of the knives 21.

The mechanism just described provides means for imparting longitudinal reciprocation to the knives 21.

The truck which receives the plaster boards after formation, and the mechanism for automatically moving said truck intermittently beneath the chute 8, will now be described.

The body 53 of the truck is rectangular in form, and is mounted on grooved wheels 54, which operate on tracks 55 located on the base or platform 1, and arranged within the truck is a series of vertical partitions 56, the ends of which are provided with flanges 57, thus forming spaces 58 in which the sections of plaster board are positioned after formation, and during the time they are hardening.

Formed on the front side and lower edge of the body 53 is a rack 59, the teeth of which are equal in length and correspond to the spaces between the partitions 56.

Fulcrumed to a bracket 60, on the under side of the base 1, is the lower end of a vertically disposed lever 61, to the upper end of which is pivotally connected a pawl 62, the point of which engages the teeth of the rack 59.

Arranged for rotation in bearings 63 fixed to the under side of the face 1 is a short shaft 64, on one end of which is a beveled pinion 65, which meshes with the beveled pinion 41, and formed on the opposite end of this shaft 64 is a crank 66, which operates in the slotted end of a connecting rod 67, which is pivotally connected to the vertical lever 61.

A spring 68 is fixed to the bracket 60, and connecting the upper end of said spring with the lever 61 is a link 69, this spring being for the purpose of maintaining the lever 61 and the pawl 62 at their rearward limit of movement.

A bolt 70 is fixed to the under side of the base 1, and provides an adjustable stop to limit the rearward swing of the lever 61.

Arranged for rotation in suitable bearings 71, at the upper end of the side frames 2, and outside the rollers 4, are rollers 72, which carry rolls 73, of paper, or analogous material, and which paper, after unwinding from the rolls, passes over the rollers 4, thence downward upon the belts 6, and from thence between the rollers 5, and through the chute 8.

The operation of the machine is as follows: A belt operating around the pulley 35 imparts rotary motion to the shaft 34, and the segmental gear wheel 36 drives the meshing pinions 7 and the rollers 5, and thus motion is imparted to the belts 6 and rollers 4. The weight of the plastic material within the hopper 3 causes the paper 73 to travel downward with the belts 6, between the rollers 5, through the chute 8, and into one of the spaces 58 between the partitions 56 in the truck, and at the same time, a quantity of the plastic material is fed downward between the two webs of paper. During this formation of the board and the downward movement thereof, the hinged section 9 of the chute vibrates backward and forward, thus producing a packing effect and smoothing or ironing out the surfaces of the board as it passes through the chute 8. This vibratory motion is obtained by means of the eccentric 13 located on the shaft 11, which is driven by a belt traveling upon the pulley 18. When the lower ends of the webs of paper, with the packing or filling of plastic material, reach the bottom of the truck 53, the teeth of the segmental gear wheel 36 leave the pinion 7, with which they have been engaged, and thus the feeding and forming mechanism just described ceases operation; and, at this point, the pin 37 engages the curved end 31 of the lever 29, moves the same upon its fulcrum, and throws the lower ends of the links 28 downward and outward. This movement swings the upper ends of the fingers 27 outward, in turn rocking the shafts 25, and the lower ends of the fingers 6 engaging in the slots 23 move the knives 21 toward one another, and through that portion of the board immediately below the chute 8, thus cutting off the section of the board which has just been formed and delivered to the truck. This movement of the fingers 26 and the knives 21 is possible owing to the provision of the slots 20 in the housings 19, through which slots the lower portions of the fingers 26 pass. The knives 21 are continuously reciprocated lengthwise in the housings 19 by means of the eccentric 46 fixed on the shaft 44, which is driven from the continuously moving shaft 11 by means of the beveled pinions 42 and 43, so that when the edges of the knives are moved toward one another, the lengthwise reciprocation easily and positively cuts the webs of paper between the lower end of the chute 8 and the top of the truck. As soon as the pin 37 leaves the end of the lever 29, the weight 32 causes said lever to return to its normal position, which action, by reason of the various connections, as described, separates the knives 21 and returns the same to their normal positions. After the pin leaves the end of the lever 29, and before the teeth of the segmental gear wheel 36 reëngage with the teeth of the pinion 7, the crank 66 actuates the connecting rod 67, in turn actuating the vertically disposed lever 61, and the pawl carried by said lever moves the truck the distance of one notch or tooth, and thus brings an empty compartment or space 58 into position immediately beneath the lower end of the chute 8. As soon as this movement is completed, the spring 68 returns the lever 61 and parts connected thereto to their normal positions; and, at this point, the teeth of the segmental gear wheel 36 reëngage with the teeth of the pinion 7, and the formation and downward movement of the plaster board is continued.

A machine of my improved construction is comparatively simple, is entirely automatic in all of its operations, and plaster boards of uniform thickness and having perfect surfaces are very rapidly and cheaply manufactured.

I claim:—

1. In a machine of the class described, a hopper, a pair of endless belts arranged for operation in the hopper and forming a bottom therefor, means whereby continuous webs of paper are delivered over the belts, and forming means located immediately beneath the lower ends of the endless belts.

2. In a machine of the class described, a hopper, a pair of endless belts arranged for operation in the hopper and forming a bottom therefor, means whereby continuous webs of paper are delivered over the belts, forming means located immediately beneath the lower ends of the endless belts, and means arranged below the forming means for cutting the webs of paper after the same pass through the forming means.

3. In a machine of the class described, a hopper a pair of endless belts arranged for operation in the hopper and forming a bottom therefor, forming means located at the lower end of the hopper, means whereby continuous webs of paper are delivered over the endless belts in the bottom of the hopper and through the forming means, and means whereby the paper delivering means is intermittently actuated.

4. In a machine of the class described, a hopper, a pair of endless belts forming the bottom of the hopper forming means located at the lower end of the hopper, means whereby continuous webs of paper are delivered over the endless belts through the bottom of the hopper and through the forming means, means arranged below the forming means for cutting the webs of paper, means whereby the paper delivering means is intermittently actuated, and means whereby the cutting mechanism is actuated at the termination of the paper delivering means.

5. In a machine of the class described, a hopper, forming means located at the lower end of the hopper, a portion of which forming means is arranged to vibrate, and means whereby webs of paper are delivered through the bottom of the hopper and through the forming means.

6. In a machine of the class described, a hopper, forming means located at the lower end of the hopper, a portion of which forming means is arranged to vibrate, means whereby webs of paper are delivered through the bottom of the hopper and through the forming means, and means arranged below the forming means for cutting the webs of paper.

7. In a machine of the class described, a hopper, forming means located at the lower end of the hopper, means whereby continuous webs of paper are delivered through the bottom of the hopper and through the forming means, means whereby the paper delivering means is intermittently actuated a pair of knives arranged beneath the forming means, and means whereby said knives are simultaneously moved lengthwise and toward one another.

8. In a machine of the class described, a frame, a chute arranged therein, means whereby continuous webs of paper are delivered through the chute, there being a filling of plastic material carried through the chute with the webs of paper, means whereby the paper delivering means is intermittently actuated means arranged below the chute for receiving the webs of paper and filling after the same discharges from the chute, and means arranged below the chute for separating the webs of paper and the filling.

9. In a machine of the class described, a frame, forming means arranged therein, means whereby webs of paper and filling of plastic material are delivered through the forming means, means whereby the paper delivering means is intermittently actuated and means arranged beneath the forming means for receiving the webs of paper and filling.

10. In a machine of the class described, a frame, forming means arranged therein, means whereby webs of paper and filling of plastic material are delivered through the forming means, means whereby the paper delivering means is intermittently actuated means located beneath the forming means for separating the webs of paper and filling into equal lengths, and means arranged between the forming means for receiving the equal sized lengths of paper, and filling.

In testimony whereof, I have signed my name to this specification, in presence of two subscribing witnesses.

CHARLES DRILL.

Witnesses:
HAROLD H. ROTH,
M. P. SMITH.